US006315547B1

(12) United States Patent
Shimalla

(10) Patent No.: US 6,315,547 B1
(45) **Date of Patent: *Nov. 13, 2001**

(54) APPARATUS FOR SUPPORTING A STARTING WEB DURING FORMATION OF THE APERTURED WEB

(75) Inventor: Charles James Shimalla, Plainsboro, NJ (US)

(73) Assignee: McNeil-PPC, Inc., Skillman, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/442,418

(22) Filed: Nov. 17, 1999

Related U.S. Application Data

(62) Division of application No. 08/995,658, filed on Dec. 22, 1997, now Pat. No. 6,024,553.

(51) Int. Cl.[7] ..................... B29C 43/22

(52) U.S. Cl. ..................... 425/290; 425/387.1

(58) Field of Search ..................... 425/86, 290, 387.1; 264/504, 557

(56) References Cited

U.S. PATENT DOCUMENTS

| | | |
|---|---|---|
| 4,151,240 | 4/1979 | Lucas et al. . |
| 4,233,017 | 11/1980 | Lucas et al. . |
| 4,395,215 | 7/1983 | Bishop . |
| 4,441,952 | 4/1984 | Mullane, Jr. . |
| 4,509,908 | 4/1985 | Mullane, Jr. . |
| 4,541,794 | 9/1985 | Raley et al. . |
| 4,543,299 | 9/1985 | Raley et al. . |
| 4,644,623 | 2/1987 | Raley et al. . |
| 4,741,877 | 5/1988 | Mullane, Jr. . |
| 4,878,825 | 11/1989 | Mullane, Jr. . |
| 5,238,644 | 8/1993 | Boulanger et al. . |
| 5,441,691 | 8/1995 | Dobrin et al. . |
| 5,567,376 | 10/1996 | Turi et al. . |
| 5,674,211 | 10/1997 | Ekdahl . |
| 5,770,144 | 6/1998 | James et al. . |
| 5,824,352 | 10/1998 | Yang et al. . |

*Primary Examiner*—Leo B. Tentoni

(57) ABSTRACT

A porous structure is provided between a forming member and an underlying support structure so as to facilitate the drainage of liquid through the porous member when a web is supported on the porous member and columnar streams of liquid are directed at the web to form apertures in the web. The porous structure can include a plurality of spaced-apart, wire-like elements, a metal screen, thermoplastic netting, mesh, webbing, and the like. An improved apertured web made with the improved process employing such a porous structure has little or no lining or marking and has relatively few, if any, poorly formed apertures.

19 Claims, 10 Drawing Sheets

APPARATUS FOR SUPPORTING A STARTING WEB DURING FORMATION OF THE APERTURED WEB

This is a Divisional of prior application Ser. No. 08/995,658, filed Dec. 22, 1997, now U.S. Pat. No. 6,024,553.

TECHNICAL FIELD

This invention relates to an apertured web of material, such as a thermoplastic film or non-woven fibrous layer, having improved aperture formation. The invention also relates to a method and apparatus for making such an apertured web. Such an apertured web is especially suitable for use as a fluid-pervious or liquid-permeable topsheet, covering, or facing sheet of an absorbent product, such as a sanitary napkin.

BACKGROUND OF THE INVENTION AND TECHNICAL PROBLEMS POSED BY THE PRIOR ART

Absorbent articles such as bandages, disposable diapers, incontinent articles, feminine sanitary protection articles, and the like, typically incorporate an absorbent member, pad, panel, or core. The side of such an absorbent core which faces toward the body of the user is typically covered with a sheet or web of facing material which is liquid-permeable. The facing web may be a nonwoven fabric comprising a web of fibers strengthened with a polymeric binding agent. The facing web may also be a thermoplastic polymeric film.

Such facing webs can be made with suitable liquid permeability characteristics by employing one highly successful type of web-aperturing technology. Specifically, a liquid-impervious precursor web or starting web is supported on a three-dimensional forming member which has recesses into which the web is deformed and which has drain holes communicating with the recesses. A fluid, such as columnar streams of liquid, is directed against the web with a force sufficient to produce apertures in the web.

Typically, this process is efficiently effected by providing the forming member as a thin, annular sleeve mounted on a rotating drum below an array of small orifices from which columnar streams of liquid are discharged against the starting web as it is supported by, and carried on, the rotating drum. The liquid streams penetrate the starting web (as the apertures are formed), and the liquid then flows to the drum through drain holes in the forming sleeve. The liquid passes through openings at the periphery of the drum and into the interior of the drum where the liquid is collected by a sump and drain system. A vacuum may be applied to the sump and drain system to aid in removing the liquid.

The U.S. Pat. No. 5,567,376 discloses such a process for making a sanitary napkin covering, topsheet, or facing web in the form of an apertured, thermoplastic polymeric film. The apertured film has micro-holes defined by a network of fiber-like elements. The U.S. Pat. No. 5,681,301 (allowed U.S. patent application Ser. No. 08/590,099) discloses an apertured film made by a similar process which can be employed as a backing web which is especially suitable for use as a breathable backing sheet (as opposed to a facing sheet) of an absorbent article, such as a bandage or the like. U.S. Pat. No. 5,670,224 discloses a process for producing an apertured nonwoven fabric wherein a starting web of nonwoven material is supported on a forming member and subjected to columnar streams of liquid to create apertures in the web.

Although the above-discussed apertured film webs or nonwoven fabric webs function well in the products for which they are designed, it would be desirable to provide such apertured webs with improved liquid-permeability characteristics. It has been found that in some apertured webs, some of the apertures are not properly formed or are incompletely formed. In some cases, there may be small areas on the web in which the desired apertures have not been formed at all. This can have a deleterious effect on the capability of the web to accommodate the transfer of fluid through the web.

It has been found that failure to create apertures in a portion of a web, and the failure to produce completely and properly formed apertures in portions of the web, results from the blockage or partial blockage of the aperturing liquid flowing through the forming member. Typically, the forming member is an annular sleeve with drain holes as discussed above. The sleeve is mounted on a rotatable support frame or drum. The support frame or drum includes spaced-apart cross bars or support members around the periphery of the drum. The inside surface of the forming sleeve is supported by such spaced-apart bars or support members. Some of the forming sleeve drain holes can be partly or completely blocked by such support members. This prevents adequate drainage of portions of the forming sleeve.

In some cases, the liquid of the columnar streams can impinge upon the support member and splash back against the edge of an aperture formed in the web. This may cause the edge of the web aperture to be pushed outwardly so as to cause an "inversion" of a peripheral portion of the web around the aperture. It is typically desired that there be no such inverted areas of the web around the apertures so that the surface of the web facing the columnar jets of liquid remains free of projections or protuberances. Then, the web can be assembled as a facing sheet on the absorbent core so that the projection-free web surface faces away from the absorbent core of the completed product and faces toward the skin of the user. However, if portions of the web around some of the apertures are inverted and project outwardly against the skin of the user, then the user may perceive that as being uncomfortable. Accordingly, it would be desirable to provide an improved apertured web having properly formed apertures with a few or no inversion areas.

When a web is employed as a covering sheet, topsheet, or facing material for a sanitary napkin, it is desirable that the outwardly facing surface of the web (i.e., the surface of the web that contacts the user) should appear clean and dry to the user--even after menstrual fluid has flowed through the facing web. The designer of a sanitary napkin is faced countervailing considerations in attempting to design a facing web which appears clean and dry even after passing menstrual flow. On one hand, large apertures in the facing web allow menstrual fluid to quickly flow through the web to the absorbent core. On the other hand, apertures that are too large permit the fluid to be transported back from the absorbent core through the facing web and to contact the skin of the user. Furthermore, large apertures or open areas in the facing web permit the absorbed fluid or stain on the absorbent core to be seen through the facing web, and this may be perceived by the user as a failure of the absorbent product to work as well as it should.

Thus, in order to exhibit the desired clean and dry properties, a facing web or cover sheet of a sanitary napkin should have apertures that are large enough and numerous enough to rapidly accept a flow of menstrual fluid and to allow the flow to pass through the facing web to the absorbent core, but the apertures should be small enough and spaced far enough apart so as to mask the stain on the absorbent core and give the user a feeling of cleanliness. When an appropriate design has been determined for the aperture size, configuration, and spacing, it is important to manufacture the web so that the apertures are properly formed. If some of the apertures are not properly formed, or are not even formed at all, the total open area of the facing web will be less than is intended. Furthermore, if the facing web has an incompletely formed or poorly formed aperture, or has merely a depression where an aperture should be, such a defect can become a site which is likely to retain menstrual fluid and stain the facing web. Thus, it would be desirable to provide an improved facing web without such defects and to provide a process for making an apertured facing web without such defects.

Such defects may occur when apertures are created in a facing web on a forming sleeve supported on a rotating drum support structure wherein the support structure includes support bars of the type discussed above. Such support bars can prevent the columnar streams of liquid from effecting penetration of the portions of the web along a line above each of the support bars. This may create "lines" of unapertured regions across the web. Even if a columnar stream of liquid penetrates a portion of the web above the underlying support bar, the resistance to the flow of the liquid through the system will be greatly increased owing to the blocking effect of the drum support bar. This can lead to poorly formed apertures.

The blockage of the columnar stream flow during the web aperturing process is of even greater concern when the web apertures are intended to be relatively large and produced by relatively large diameter columnar streams of liquid. For example, with one presently contemplated preferred form of an apertured web, it is desirable to employ columnar streams of liquid to form the apertures in a stretchable, thermoplastic, polymeric film. The liquid streams are discharged from orifices which have a diameter in the range of between about 0.010 inch and about 0.040 inch. This results in a relatively high liquid flow rate. With such a high low rate, it is necessary to provide a relatively low resistance to the flow of liquid through the forming sleeve and underlying rotatable drum support structure so as to avoid marking or lining of the web material.

When making some types of apertured web materials, such as tricot fabric, the forming sleeve has relatively small drain holes. The small drain holes may each have a diameter which is considerably less than the width of the cross bars in the rotatable support drum on which the forming sleeve is mounted. Some of the drain holes can be completely blocked by the cross bars. This can prevent apertures from being formed in the web along the support bars, and this can create objectionable marks or lines in the apertured web which reduce the fluid transmission capability of the apertured web.

Accordingly, it would be desirable to provide an improved process for making an apertured web using columnar streams, especially columnar streams which discharge from orifices having diameters of 0.010 inch to 0.040 inch or greater, wherein the improved process eliminates, or at least substantially minimizes, the creation of poorly formed apertures as well as unwanted lines across the material in which no apertures are formed.

SUMMARY OF THE INVENTION

The present invention provides an improved apertured web, and an improved apparatus and process for supporting the web during formation of the apertures.

According to one aspect of the present invention, an apparatus is provided for supporting a starting web of material in the path of fluid directed at the starting web to cause the formation of an apertured web. The apparatus includes a support structure having at least one outwardly facing support surface. A forming member is mounted on the support structure. The forming member has a mounting surface on one side facing toward the one support surface of the support structure and has a web-engaging forming surface on the other side against which the starting web can be disposed. The web-engaging forming surface includes recesses into which portions of the starting web may be deformed. The forming member defines drain holes extending from the recesses through the forming member to the mounting surface. At least one of the drain holes extends at least partly over the one support surface of the support structure. A porous structure is disposed between the support structure and the forming member mounting surface. The porous structure defines at least one open area which is located at least partly between the one support surface and the one drain hole and which extends laterally beyond the one support surface to accommodate fluid flow from the one drain hole past the one support surface.

According to another aspect of the invention, an apparatus is provided for supporting a starting web of material in the path of fluid directed at the starting web to cause the formation of an apertured web. The apparatus includes a support structure having at least one outwardly facing support surface. A forming member is mounted on the support structure. The forming member has a mounting surface on one side facing toward the one support surface of the support structure and has a web-engaging forming surface on the other side against which the starting web can be disposed. The web-engaging forming surface includes recesses into which portions of the starting web may be deformed. The forming member defines drain holes extending from the recesses through the forming member to the mounting surface so that at least one of the drain holes faces the one support surface of the support structure. At least one of the drain holes extends at least partly over the one support surface of the support structure. A porous structure is disposed between the support structure and the forming member mounting surface. The porous structure defines at least one curved surface which faces the one drain hole and which is located between the one drain hole and the one support surface to accommodate fluid flow from the one drain hole past the one support surface.

Another aspect of the invention includes a method for producing an apertured web. The method includes the step of providing the following structures: (1) a support structure having at least one outwardly facing support surface; (2) a forming member mounted on the support structure and having a mounting surface on one side facing toward the one support surface of the support structure and having a web-engaging forming surface on the other side; and (3) a porous structure that is disposed between the support structure and the forming member mounting surface. The web-engaging forming surface includes recesses, and the forming member defines drain holes extending from the recesses through the forming member to the mounting surface. At least one of the drain holes extends at least partly over the one support surface of the support structure. The porous structure defines at least one open area which is located at least partly between the one support surface and the one drain hole. The open area extends laterally beyond the one support surface to accommodate fluid flow from the one drain hole past the one support surface.

The process further includes the step of supporting a starting web of material on the web-engaging forming surface. The fluid is directed against the starting web to cause portions of the starting web to be deformed into the recesses and to cause the formation of apertures through the starting web to define the apertured web as the fluid flows through the apertures. At least some of the fluid is drained at least (a) through the one drain hole, (b) through the one open area, and (c) past the one support surface. The apertured web can then be removed from the forming surface.

The invention also includes another form of the method for producing an apertured web. The method includes the step of providing the following structures: (1) a support structure having at least one outwardly facing support surface; (2) a forming member mounted on the support structure and having a mounting surface on one side facing toward the one support surface of the support structure and having a web-engaging forming surface on the other side; and (3) a porous structure that is disposed between the support structure and the forming member mounting surface. The web-engaging forming surface includes recesses, and the forming member defines drain holes extending from the recesses through the forming member to the mounting surface so that at least one of the drain holes faces the one support surface of the support structure. The one drain hole extends at least partly over the one support surface of the support structure. The porous structure defines at least one curved surface which faces the one drain hole and which is located between the one drain hole and the one support surface.

The process further includes the step of supporting a starting web of material on the web-engaging forming surface. The fluid is directed against the starting web to cause portions of the starting web to be deformed into the recesses and to cause the formation of apertures through the starting web to define the apertured web as the fluid flows through the apertures. At least some of the fluid is drained at least (a) through the one drain hole, (b) through the one open area, (c) alongside the curved surface, and (d) past the one support surface. The apertured web can be removed from the forming surface.

The invention further includes an apertured web that has a reduced number of incompletely formed apertures and that is made by a process which employs the following structures: (1) a support structure having at least one outwardly facing support surface; (2) a forming member mounted on the support structure and that has a mounting surface on one side facing toward the one support surface of the support structure and has a web-engaging forming surface on the other side; and (3) a porous structure that is disposed between the support structure and the forming member mounting surface. The web-engaging forming surface includes recesses, and the forming member defines drain holes extending from the recesses through the forming member to the mounting surface. At least one of the drain holes extends at least partly over the one support surface of the support structure. The porous structure defines at least one open area which is located at least partly between the one support surface and the one drain hole and which extends laterally beyond the one support surface to accommodate fluid flow from the one drain hole past the one support surface.

The process includes the further step of supporting a starting web of material on the web-engaging forming surface. Fluid is directed against the starting web to cause portions of the starting web to be deformed into the recesses and to cause the formation of apertures through the starting web to define the apertured web as the fluid flows through the apertures. At least some of the fluid is drained at least (a) through the one drain hole, (b) through the one open area, and (c) past the one support surface. The apertured web is removed from the forming surface.

A further aspect of the invention includes an apertured web that has a reduced number of incompletely formed apertures and that is made by another form of the process which employs the following structures: (1) a support structure having at least one outwardly facing support surface; (2) a forming member mounted on the support structure and that has a mounting surface on one side facing toward the one support surface of the support structure and has a web-engaging forming surface on the other side; and (3) a porous structure that is disposed between the support structure and the forming member mounting surface. The web-engaging forming surface includes recesses, and the forming member defines drain holes extending from the recesses through the forming member to the mounting surface so that at least one of the drain holes faces the one support surface of the support structure. At least one of the drain holes extends at least partly over the one support surface of the support structure. The porous structure defines at least one curved surface which faces the one drain hole and which is located between the one drain hole and the one support surface.

The process includes the further step of supporting a starting web of material on the web-engaging forming surface. Fluid is directed against the starting web to cause portions of the starting web to be deformed into the recesses and to cause the formation of apertures through the starting web to define the apertured web as the fluid flows through the apertures. At least some of the fluid is drained at least (a) through the one drain hole, (b) through the one open area, (c) alongside the curved surface, and (d) past the one support surface. The apertured web can then be removed from the forming surface.

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same.

DESCRIPTION OF THE PREFERRED EMBODIMENTS

While this invention is susceptible of embodiment in many different forms, this specification and the accompanying drawings disclose only some specific forms as examples of the invention. The invention is not intended to be limited to the embodiments so described, however. The scope of the invention is pointed out in the appended claims.

For ease of description, the apparatus of this invention is described in a normal operating position, and terms such as upper, lower, horizontal, etc., are used with reference to this position. It will be understood, however, that the apparatus of this invention may be manufactured, stored, transported, and sold in an orientation other than the position described.

Figures illustrating the apparatus show some mechanical elements that are known and that will be recognized by one skilled in the art. The detailed descriptions of such elements are not necessary to an understanding of the invention, and accordingly, are herein presented only to the degree necessary to facilitate an understanding of the novel features of the present invention.

A process for making an apertured web, especially an apertured web that can be used as a covering or facing sheet for a sanitary napkin, is disclosed in U.S. Pat. No. 5,567,376 which is incorporated herein by reference thereto. The apertured web is produced from a starting web, or precursor web, which is not apertured and which can accommodate significant elastic stretching. Such a precursor web may be, for example, stretchable film comprising a thermoplastic polymeric material including polyolefins, such as polyethylene (high, linear low, or low density) and polypropylene; copolymers of olefins and vinyl monomers, such as copolymers of ethylene and vinyl acetate or vinyl chloride; polyamides; polyesters; polyvinyl alcohol and copolymers of olefins and acrylate monomers such as copolymers of ethylene and ethyl acrylate. Film comprising mixtures of two or more such polymeric materials may also be used.

Generally, in a form of the process for making the apertured film as disclosed in the U.S. Pat. No. 5,567,376, portions of a starting film or precursor film are deformed against a backing member, forming member, forming surface, or forming sleeve, and a portion of such a forming sleeve 64 is shown in FIGS. 1–6 herein. A generally flat, plate-like forming surface could alternatively be employed in a variation of the process.

Figure 1:
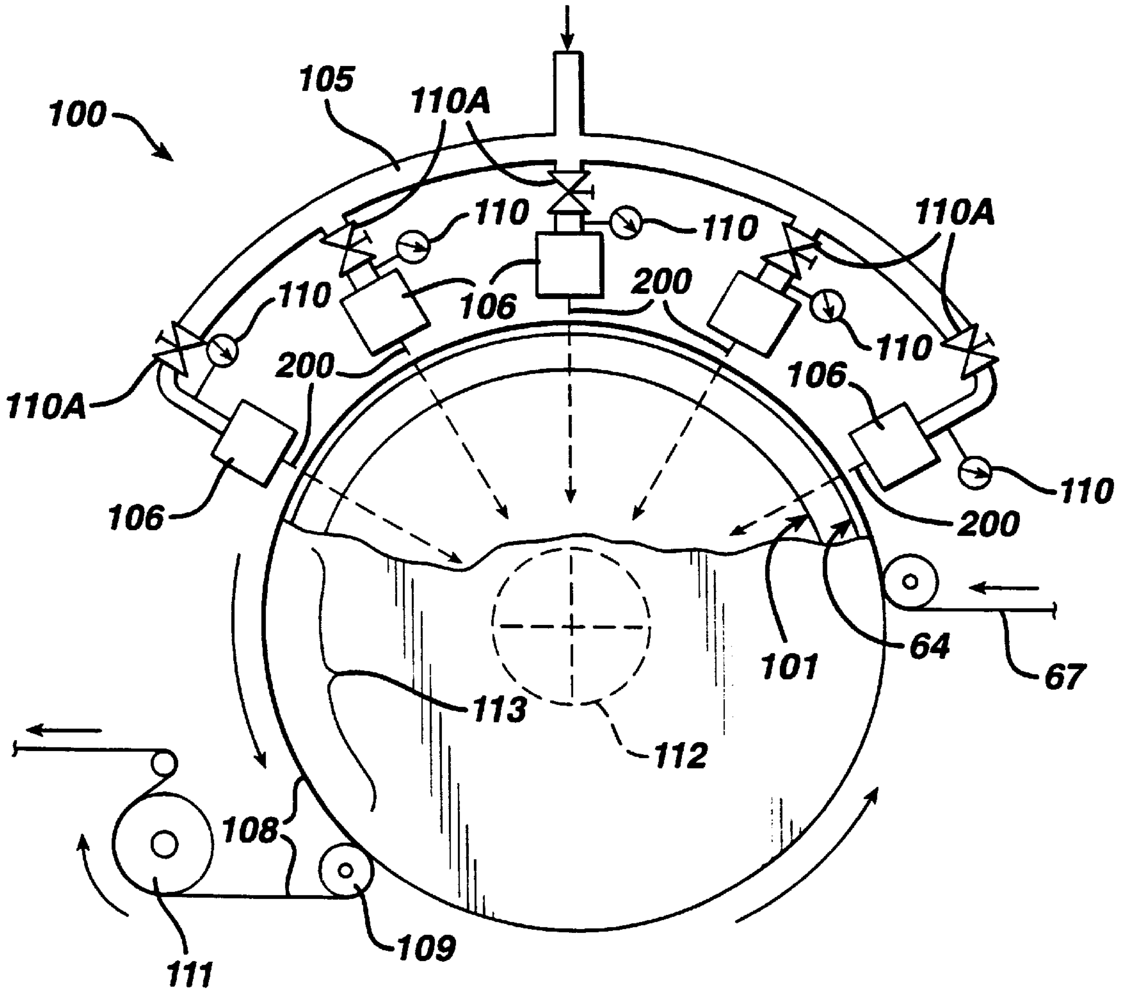
FIG. 1 PRIOR ART
FIG. 1 is a simplified, diagrammatic view of a system for producing an apertured web.
Figure 2:
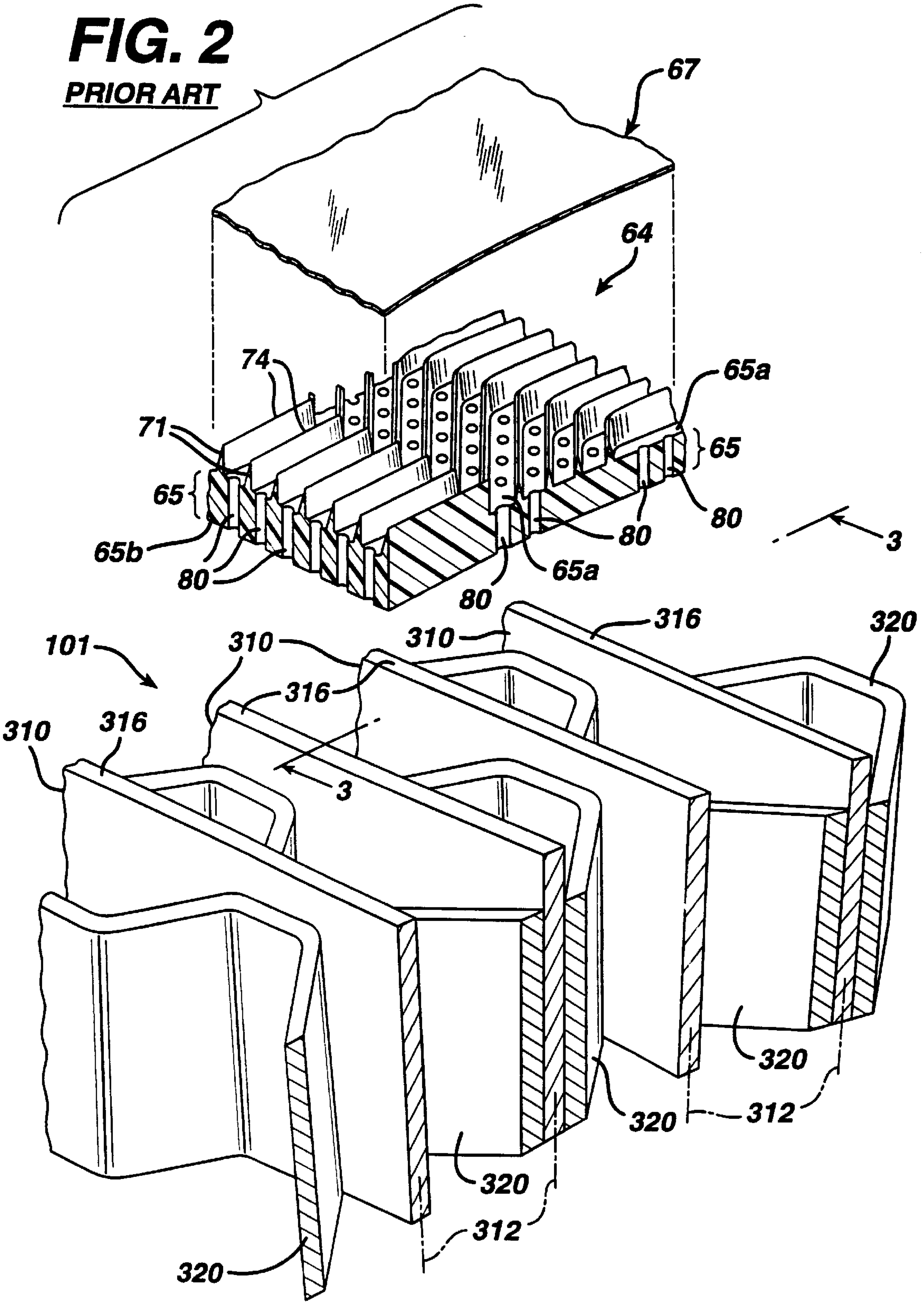
FIG. 2 PRIOR ART
FIG. 2 is a greatly enlarged, fragmentary, exploded, perspective view of the components shown schematically in FIG. 1, and FIG. 2 specifically illustrates a portion of the precursor web or starting web, a portion of the topographical forming surface or sleeve against which the starting web is forced during processing, and a portion of the rotatable drum on which the forming sleeve is mounted.

FIG. 2 illustrates a portion of the hollow cylindrical wall of the topographical forming sleeve 64 along with a portion of a rotatable support drum 101 on which the sleeve 64 is mounted. The sleeve 64 and drum 101 rotate together in an apertured film production machine or apparatus 100 as shown in FIG. 1.

FIG. 2 also shows an exploded perspective view of a precursor web or starting web 67 adjacent the sleeve 64. When the apparatus 100 is operated, the starting web lies against the sleeve 64 as shown in FIG. 1. The illustrated precursor web 67 is a film which may be embossed or smooth, may incorporate or be coated with a surfactant, and may be subjected to a corona discharge treatment. The forming sleeve 64 comprises a base portion 65 having an upper surface 65*a* and a lower surface or mounting surface 65*b*. A plurality of drain holes 80 extend through the thickness of base portion 65 from the upper surface 65*a* to the lower mounting surface 65*b*. Drain holes 80 are provided in the base portion 65 to allow for removal of fluid (e.g., water) during the manufacture of the apertured web.

The forming sleeve 64 may have a variety of surface configurations. The present invention may be employed with a sleeve having any type of surface configuration. By way of example, one known type of sleeve surface configuration will next be described.

The surface of the sleeve 64 is defined, at least in part, by a plurality of vertically extending support elements 71. Each of the support elements has a base 78 coinciding with the plane of the upper surface 65*a* of the base portion 65 and has a pair of angled sidewalls 72, 73 (best seen in FIG. 4). The sidewalls 72, 73 extend upwardly from the base 78 and meet to define a land portion or ridge 74.

The support elements 71 are aligned in a generally parallel array and are spaced equidistantly from one another. They may run either parallel to, perpendicular to, or at any angle to the longitudinal axis (i.e., rotation axis) of the forming sleeve 64. As shown in FIG. 2, the support elements 71, when viewed in plan, have a generally sinusoidal or wavy configuration. The support elements 71 could have other configurations (e.g., straight-line, zig-zag, and the like). The support elements 71 may be characterized as defining one or more web-engaging surfaces on which the web or film 67 is supported. Recesses or channels are defined between the elements 71 and communicate with the drain holes 80.

Figure 4:
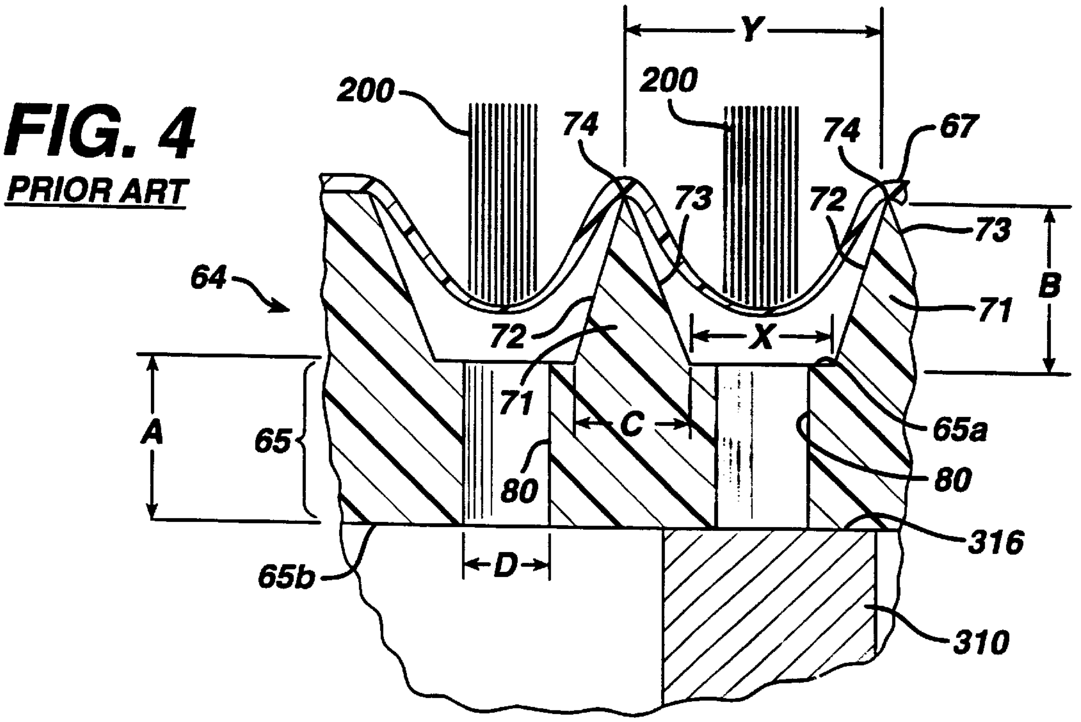
FIG. 4 PRIOR ART
FIG. 4 is a cross-sectional view similar to FIG. 3, but FIG. 4 is more greatly enlarged and shows columnar streams of liquid forcing the starting web against the forming sleeve.

Dimensional relationships of the various features of the forming sleeve 64 are indicated in FIG. 4. This type of forming sleeve 64 may typically have a base 65 with a thickness A ranging between about 0.075 inch and about 0.120 inch. However, the dimension A may be greater or smaller. Each web support element 71 may have a height B, measured from the base 65*a* to the ridge 74, ranging between about 0.075 inch and about 0.120 inch. However, the dimension B may be greater or smaller. The base 78 of each support element 71 may have a width C of about 0.030 inch. However, the dimension C may be greater or smaller.

The support members 71 may be spaced apart by a distance X at the base portion upper surface 65*a* of about 0.06 inch. However, the dimension X may be greater or smaller. The ridges 74 at the tops of the support members 71 are spaced apart by a distance Y, and the distance Y may be about 0.083 inch. The distance Y may be greater or smaller, however.

Each drain hole 80 may have any desired configuration. Typically, the transverse cross section of each drain hole 80 is identical and is oval or circular. In one embodiment, the drain holes 80 may have a circular transverse cross-section, and the diameter D of each drain hole 80 may range between about 0.028 inch and about 0.036 inch. However, the diameter D may be greater or smaller.

The row of drain holes 80 within a recess between two support elements 71 may typically be spaced on a center-to-center distance of about 0.044 inch. However, in one typical design of the forming sleeve 64, each drain hole 80 that is located at the region where the ribs change direction may be spaced at a center-to-center distance of about 0.057 inch from the two adjacent apertures. The drain holes 80 may also have other spacing arrangements.

The forming sleeve 64 has an outside diameter typically in the range from about 2 feet to about 6 feet, a length typically in the range from about 2 feet to about 16 feet, and a nominal wall thickness typically in the range of between about 0.125 inch and about 0.25 inch. However, a sleeve 64 with other dimensions may be used. The sleeve 64 is typically made from an acetal polymer. Acrylic or other materials may also be used.

The specific forming surface configuration of the sleeve 64 (e.g., vertical support elements 71) and the drain holes 80 can be produced by a known laser drilling or laser engraving process effected on a smooth, annular, starting cylinder. The laser engraving process can be controlled to produce the desired contours, hole sizes, spacing, etc. A number of different types of apertured webs can be produced with different forming surfaces which can be manufactured with the laser engraving process by varying the appropriate engraving process parameters as described in, for example, the U.S. Pat. Nos. 5,567,376 and the 5,681,301 (allowed U.S. patent application Ser. No. 08/590,099). The method and apparatus for manufacturing the sleeve 64 forms no part of the present invention.

The sleeve 64 is adapted to be mounted on the rotatable drum 101 in the web processing machine 100 as shown in FIG. 1. The drum 101 typically has a honeycomb structure, or other structure with openings between sleeve support members, to allow for the passage of fluids therethrough as described in detail hereinafter. The detailed design of the drum components forms no part of the present invention.

The drum 101 is rotated in a counterclockwise direction (as viewed in FIG. 1) by a suitable conventional or special mechanism (which forms no part of the present invention). The sleeve 64 is carried on, and therefore rotates with, the drum 101.

Disposed about a portion of the periphery of the drum 101 (and sleeve 64 mounted thereon) is a system for directing fluid, such as water, toward the sleeve 64. The detailed design and operation of such a fluid directing system forms no part of the present invention. The system typically includes a manifold 105 (FIG. 1) connecting a plurality of orifice strips 106 for directing columnar streams of water against the starting web 67 carried on the outer surface of sleeve 64. Each orifice strip 106 comprises one or more rows of small, uniform, circular holes or orifices. The diameter of the orifices typically ranges from about 0.005 inch (0.0127 cm) or less to about 0.040 inch (0.0254 cm) or more. There typically may be as many as 50 or 60 holes per linear inch.

Water is directed under pressure through the orifices to form columnar streams 200 which impinge on the upper surface of the starting web 67 in a contact zone or aperturing zone below the orifice strips 106. The distance from the orifice strips 106 to the upper surface of web 67 being processed is typically about 0.75 inch (1.90 cm). The pressure of the water supplied to the orifice strips 106 is controlled by pressure control valves 110A, the pressure being indicated by pressure gauges 110.

Inside the drum 101 there is a stationary sump and drain system 112 to which a vacuum may be applied to aid in removing water so as to keep the aperturing zone from flooding.

In operation, the starting web 67 is passed around the sleeve 64 in the counterclockwise direction (as viewed in FIG. 1) under the water ejecting orifice strips 106. As the web 67 passes beneath the orifice strips 106, the web 67 is formed into the apertured web 108 of the invention. The apertured web 108 is removed from the sleeve 64 by a stripper roll 109 and is passed over the outer surface of a perforated cylinder 111 operating under a vacuum to remove any residual processing water. Residual water may also be removed from the web 108 by directing a stream of air against it before the web 108 is wound on a spool as the finished apertured web of the invention. Residual water could also be removed by hot air drying, steam can drying, infrared radiation drying, and the like.

The result of this process is that apertures are formed in the web 108 as the web deforms on the forming surface sleeve 64. The web 108 acquires a three-dimensional configuration owing to contact between portions of the web 108 and some of the structural elements or surfaces of the sleeve 64. When certain kinds of thermoplastic film are used as the starting web 67, the resulting apertured web 108 can have drape and feel characteristics that are generally similar to some conventional, woven fabrics.

Figure 3:
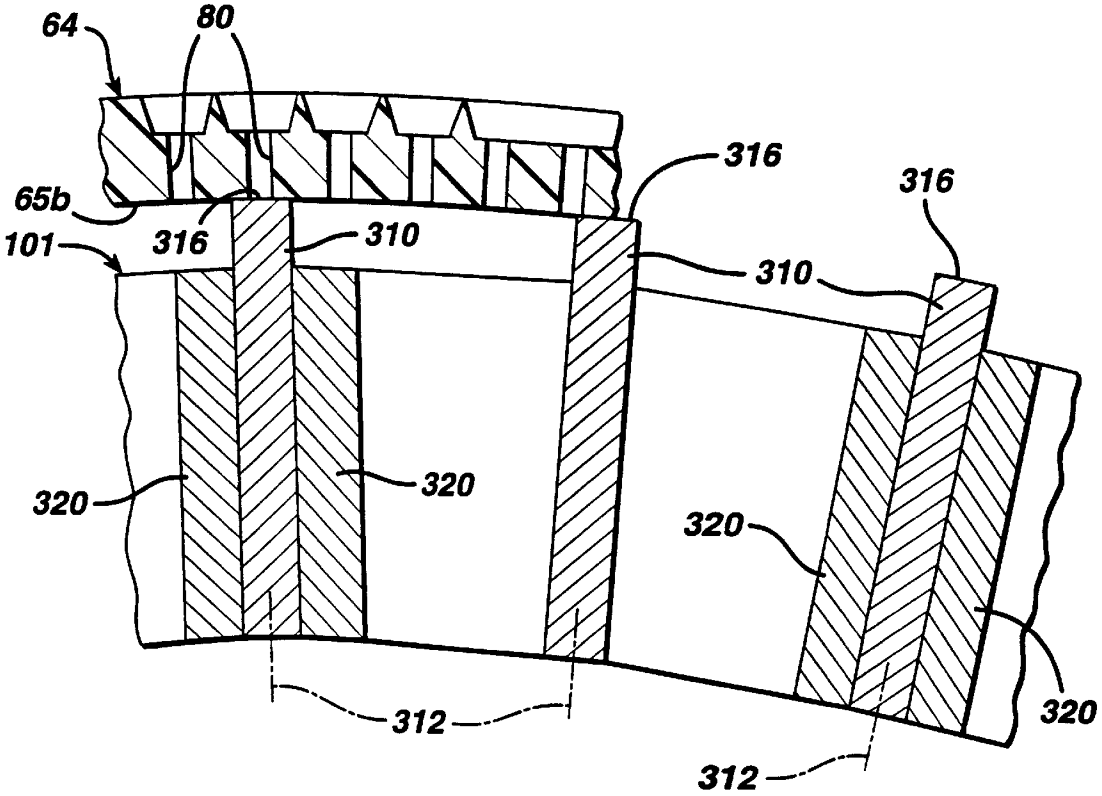
FIG. 3 PRIOR ART
FIG. 3 is a fragmentary, cross-sectional view taken generally along the plane 3—3 in FIG. 2.

One conventional form of the sleeve support structure of the drum 101 is shown in detail in FIGS. 2 and 3. The sleeve support structure includes a plurality of cross bars or support bars 310. The support bars extend along the periphery of the drum 101 and are generally parallel to the longitudinal axis of the drum about which the drum rotates. More particularly, each support member 310 lies on a radius 312 of the support drum. The radially outermost end of each support bar 310 defines a generally planar support surface 316. Prior to the present invention, known drum systems supported the sleeve mounting surface 65*b* directly on the planar surfaces 316 as illustrated in FIGS. 3–6.

As shown in FIG. 2, each support member or bar 310 lies between a pair of corrugated bars 320 to provide structural rigidity. As illustrated in FIG. 3, the corrugated bars 320 are not as high as the support bars 310. In one typical design, the support bars 310 are about 1 inch high, and each corrugated bar 320 is about 0.875 inch high. Thus, each support bar 310 projects outwardly beyond the tops of the adjacent corrugated bars 320 by about 0.125 inch. Further, in this particular design, each corrugated bar 320 has a thickness of about 0.068 inch and each support bar 310 has a thickness of about 0.068 inch. The centerline spacing between the support surfaces 316 of the support bars 310 in this particular design may be between about 0.3 and about 0.4 inch. In another known design, the support surfaces 316 are each about 0.031 inch wide and have a centerline spacing of about 0.273 inch.

The corrugated bars 320 define what may be characterized as a generally honeycomb type of configuration, but with the straight cross bars 310 bisecting the hexagonal cells of the honeycomb structure.

At each end of the drum 101, the bars 310 and 320 terminate and are supported by suitable end structures (the details of which are not visible in the figures). The end structures accommodate rotation of the drum 101 and accommodate the removal of the liquid through elements of the stationary sump and drain system 112 (FIG. 1) which is mounted within the drum interior. The detailed arrangement of the end structure to which the honeycomb support structure is attached, as well as the detailed arrangement of the internal sump and drain system 112, form no part of the present invention.

With reference to FIGS. 2 and 3, it will be appreciated that some of the drain holes 80 of the sleeve 64 may be partly or completely blocked by the planar support surface 316 of one or more of the support bars 310. The support sleeve 64 can be mounted on the support drum in any rotational position relative to the support drum 101. Thus, those particular drain holes 80 which may be partly or completely blocked by the support bars 310 cannot be determined in advance. Indeed, the same support drum 101 could be used from time to time to support different forming sleeves 64 having different size drain holes 80 spaced apart in different arrangements. Generally, some of the drain holes 80 in any such forming sleeves 64 would be blocked or partially blocked by at least one, and typically many, of the support bars 310.

The drum 101 may alternatively incorporate a sleeve support structure that is different from the honeycomb structure described above and that includes the bars 310 and 320. Other suitable drum structures may be provided with appropriate sleeve support elements or surfaces.

Figure 5:
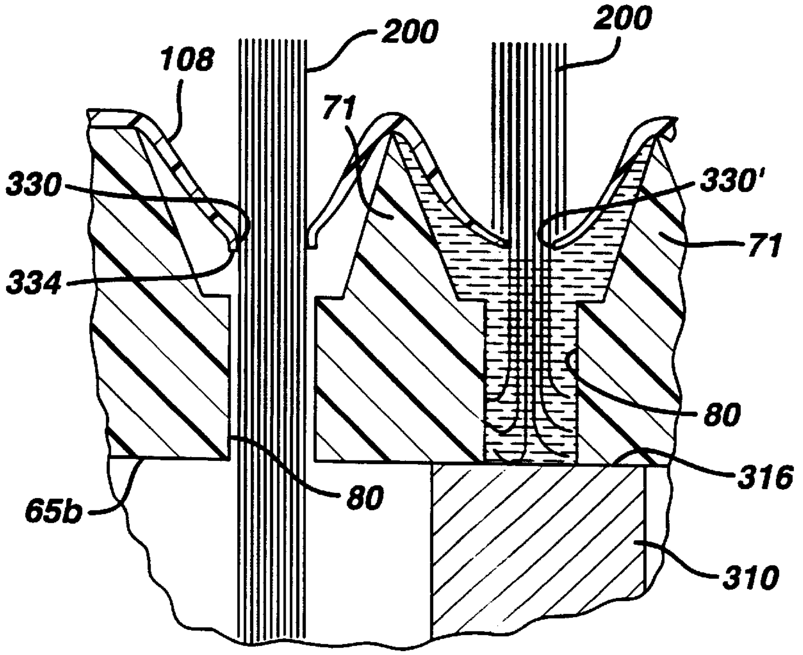
FIG. 5 PRIOR ART
FIG. 5 is a view similar to FIG. 4, but FIG. 5 shows at a later stage in the process.
Figure 6:
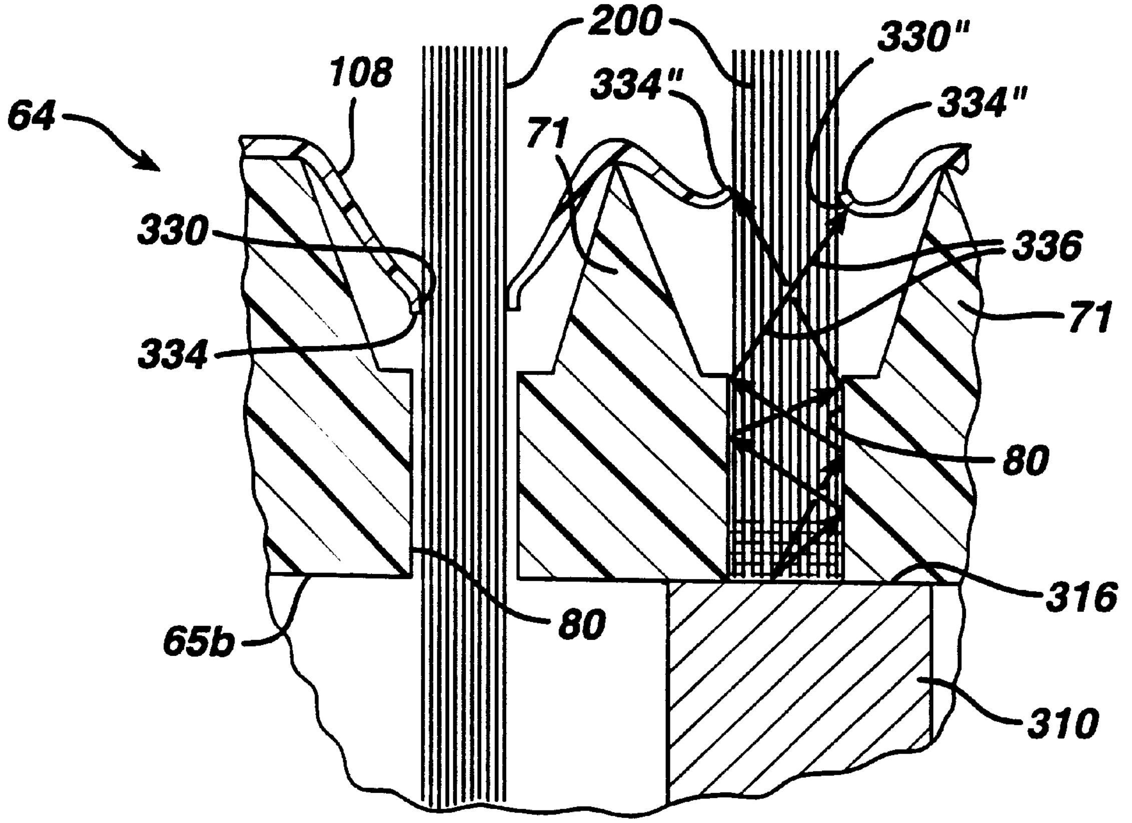
FIG. 6 PRIOR ART
FIG. 6 is a view similar to FIG. 5 showing an alternate condition which may occur.

FIGS. 4–6 illustrate the operation of the aperturing system or machine 100 to produce the apertured web 108 (FIGS. 5 and 6) from the starting web 67 (FIG. 4). As shown in FIG. 4, the starting web 67 is subjected to a pressure differential as the columnar streams 200 are directed against, and impinge upon, portions of the web 67. Portions of the web 67 stretch and become thinner between the ridges 74 of the support members 71. The thinned portions of the web 67 are forced downwardly into the recesses between the support elements 71.

In the particular process illustrated in FIGS. 46, 6, each columnar stream 200 has a diameter of about 0.025 inch. Each drain hole 80 has a diameter of about 0.028 inch. Eventually, some, many, or all of the columnar streams 200 burst through the web 67 to form the apertured web 108 having apertures 330 as shown on the left-hand side in FIGS. 5 and 6.

The liquid from most of the columnar streams readily passes through the drain holes 80 which are not completely or partly blocked by a support bar 310 and flows with little resistance into the interior of the drum 101. On the other hand, as shown on the right-hand side in FIG. 5, where a drain hole 80 is completely blocked by a support bar 310, an aperture 330' may be formed in the web, but the liquid cannot flow out of the drain hole. The blocked drain hole fills with liquid, and the recessed region between the support elements 71 above the blocked drain hole can start to fill with liquid. This can lead to improper aperture formation. As a result, the aperture 330' may be incompletely formed.

Preferably, as shown for the properly formed aperture 330 on the left hand side in FIG. 5, it is desired that the apertures have a peripheral edge 334 which is deflected downwardly or inwardly away from the upwardly facing surface of the apertured web 108. This will provide the web with an upper surface that is free of edges or edge-like projections which might be perceived as rough or uncomfortable against the skin. The web 108 may be arranged as a cover sheet on an absorbent product so that the side of the web with the projecting peripheral edges 334 faces the interior part of the product, such as an absorbent pad, and so that the peripheral edges 334 would not be felt by the user.

However, if the columnar stream 200 creates an aperture above a support member 310 in the drum 101, then there is a possibility that some of the liquid from the columnar stream 200 could be deflected upwardly against the web 108 as illustrated for the right-hand aperture 330" in FIG. 6. Because the drain hole 80 below the right-hand aperture 330" is completely blocked by the drum support bar 310, some of the liquid in the columnar stream 200 is deflected upwardly or splashes upwardly as schematically shown by the arrows 336. This may force the aperture 330" to invert and create an outwardly projecting peripheral edge 334". This may create an objectionable roughness or tactile sensation as perceived by the user.

Figure 4A:
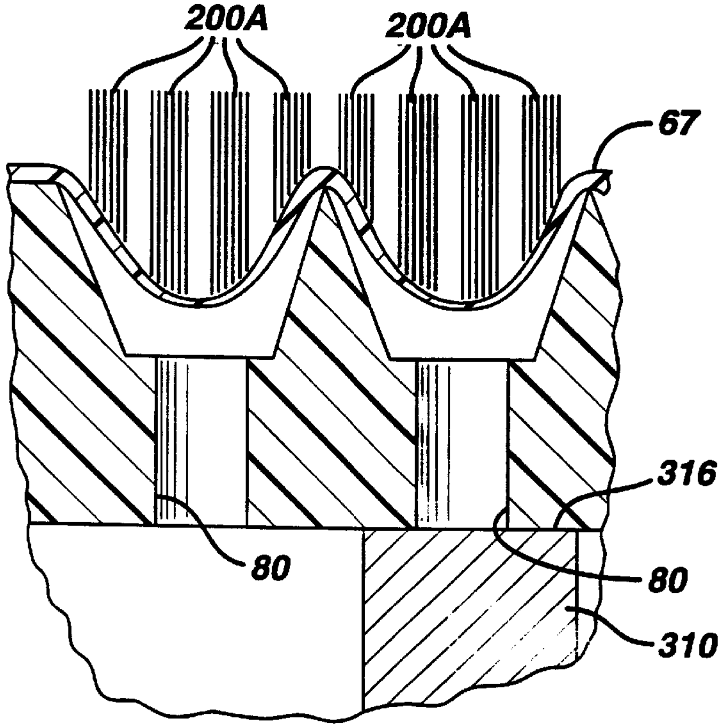
FIG. 4A PRIOR ART
FIG. 4A is a view similar to FIG. 4, but FIG. 4A illustrates a variation in the process employing a greater number of smaller columnar streams of liquid.
Figure 5A:
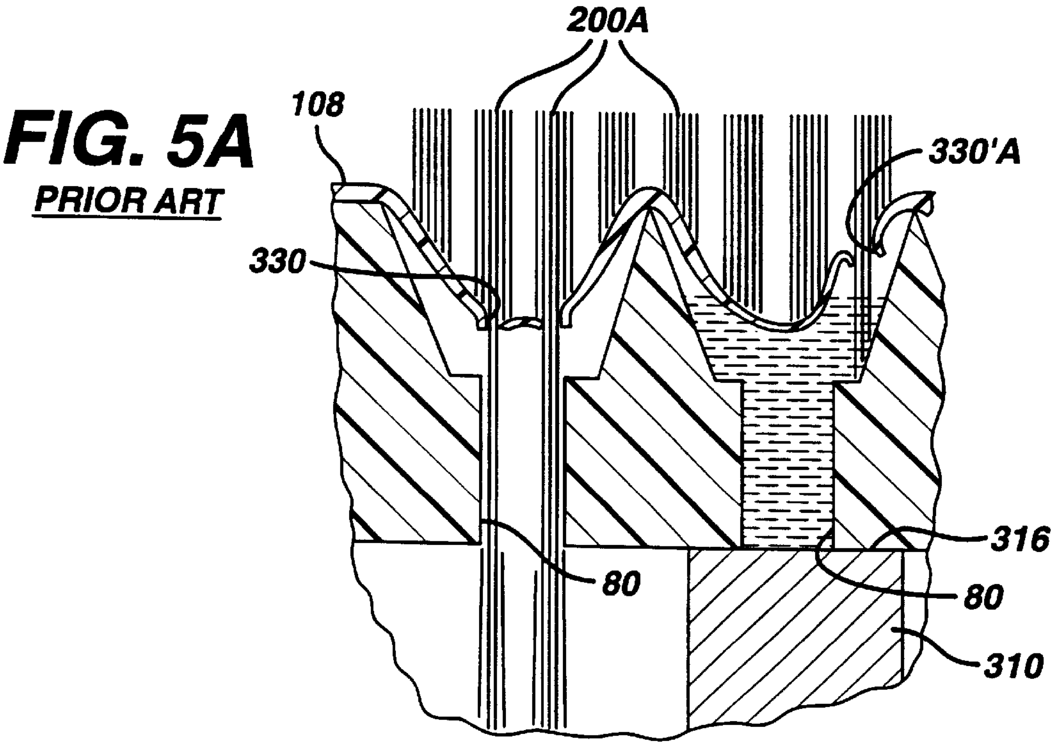
FIG. 5A PRIOR ART
FIG. 5A is a view similar to FIG. 5, but FIG. 5A illustrates a variation in the process employing a greater number of smaller columnar streams of liquid.
Figure 6A:
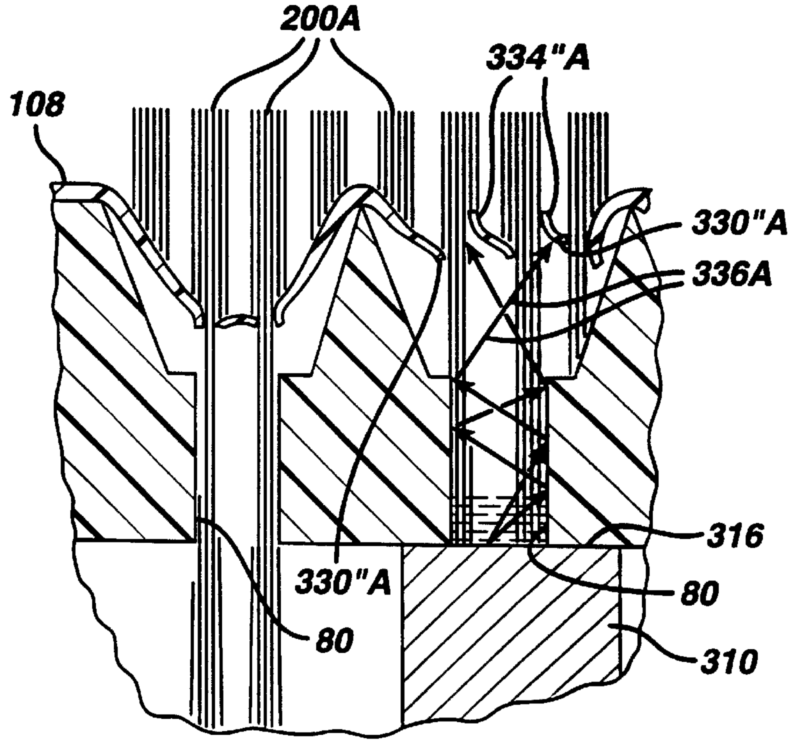
FIG. 6A PRIOR ART
FIG. 6A is a view similar to FIG. 6, but FIG. 6A illustrates a variation in the process employing a greater number of smaller columnar streams of liquid.

FIGS. 4A, 5A, and 6A show a modified form of the process described above with respect to FIGS. 4, 5, and 6, respectively. In the modified process illustrated in FIGS. 4A, 5A, and 6A, a plurality of smaller, and more closely spaced, columnar streams 200A are employed for creating apertures in the web. Initially, as illustrated in FIG. 4A, the streams 200A cause the web 67 to be deformed downwardly into the recesses above the drain holes 80 and to stretch and become thinner. As shown for the drain hole 80 on the left-hand side of FIG. 5A, two or more apertures 330A may be formed in a recess generally above the drain hole 80.

On the other hand, in the recess above the right-hand drain hole 80 in FIG. 5A, an aperture 330'A may be initially formed in the web, but the liquid flowing through the initially formed aperture is blocked by the drum support member 310 beneath the drain hole 80, and the liquid may then fill the drain hole 80 above the support bar 310 and part of the region above the drain hole beneath the web 108. This may prevent the proper formation of other apertures that would normally be formed in that region of the web. Thus, the web may have fewer apertures formed in certain regions of the web than would be intended.

Alternatively, as shown in FIG. 6A, one or more of the columnar streams 200A may create apertures 330"A in the web 108 over the blocked drain hole 80 as shown on the right-hand side of FIG. 6A, and some of the liquid may be deflected back or splash back upwardly (as indicated by the arrows 336A). The deflected liquid may impinge against peripheral portions of the apertures 330"A to create undesirable, outwardly projecting inversions or edges 334"A.

Figure 7:
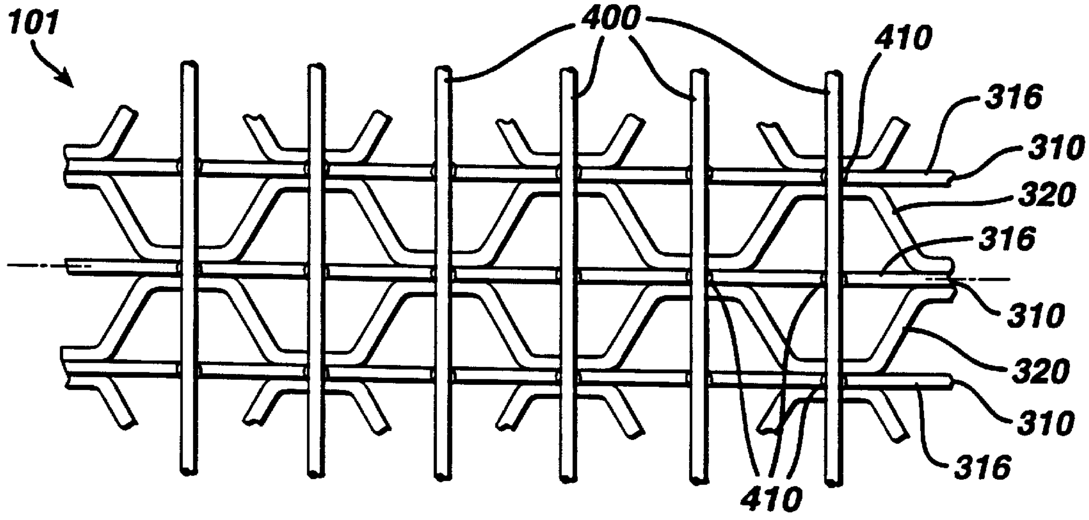
FIG. 7 is a fragmentary, plan view of a portion of the support drum incorporating features of the present invention.
Figure 8:
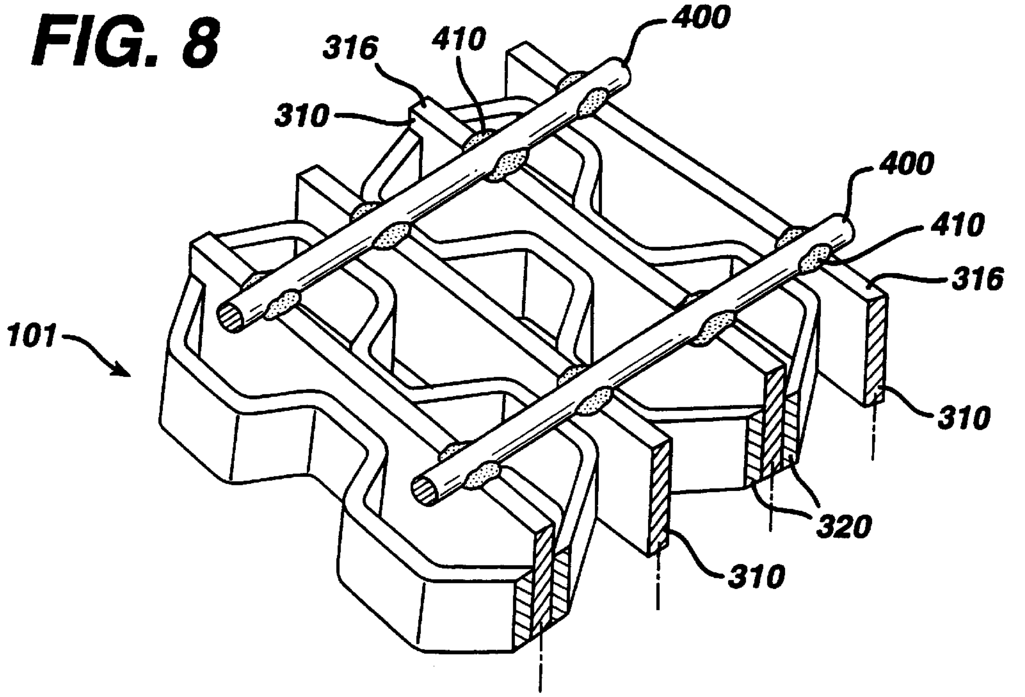
FIG. 8 is a fragmentary, perspective view of a portion of the drum shown in FIG. 7.
Figure 9:
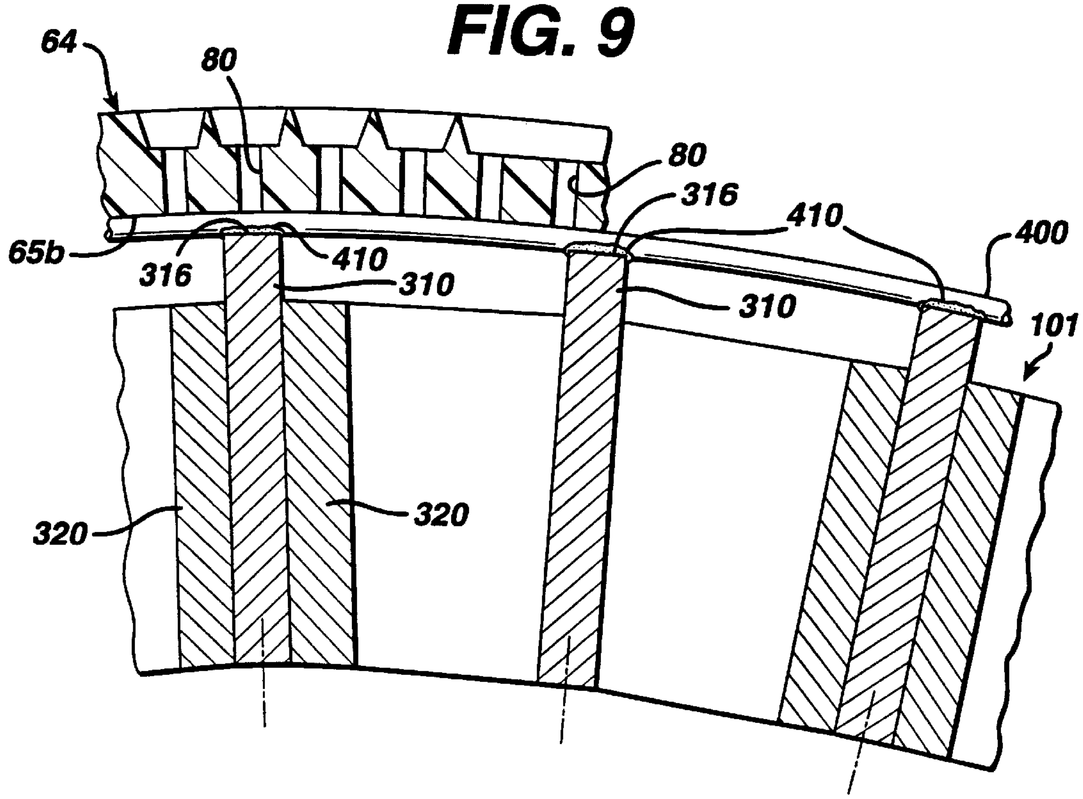
FIG. 9 is a view similar to FIG. 3, but FIG. 9 shows features or elements of the present invention incorporated in the apparatus.

According to the present invention, a novel porous structure can be interposed between the forming sleeve 64 (or other type of forming structure) and the underlying support drum (or other type of support structure). One form of such a porous structure is illustrated in FIGS. 7–9 and is designated therein by the reference number 400. In particular, the porous structure includes a plurality of equally spaced, parallel rods, wires, or wire-like elements 400 which are arranged circumferentially around the drum 101 and which are secured to portions of the support surface 316 of each support bar 310. Each wire-like element 400 is preferably attached to the support bars 310 with welds 410 in a preferred embodiment wherein the wire-like elements 400 are fabricated from steel and the support bars 310 are preferably fabricated from steel. Each element 400 has a generally circular transverse cross section.

The forming sleeve 64 has an inner diameter (as measured at the mounting surface 65*b* (FIG. 9)) which is typically at least 0.1 inch greater than the outside diameter of the drum 101 (as measured to the outside support surfaces 316 of the support bars 310). Thus, sleeve 64 can be readily mounted on the drum 101 after the wire-like elements 400 have been attached to the drum support bars 310—so long as the diameter of the wire-like elements 400 is 0.05 inch or less.

Even thicker wire-like elements 400 could be employed, however. This is because the tubular blank or starting cylinder used in fabricating the forming sleeve 64 is typically shrunk to a desired diameter prior to creating the forming surface in it. The amount of shrinkage can be controlled. The starting blank cylinder could be shrunk somewhat less to accommodate thicker wire-like elements 400, if desired.

It will be appreciated that the wire-like elements 400 create an annular space between the sleeve mounting surface 65*b* and the support surface 316 of the support bars 310 in the drum 101. The wire-like elements 400 preferably have a diameter which is somewhat less than, or considerably less than, the diameter of the drain holes 80. Thus, liquid can readily flow from the drain holes 80 past the wire-like elements 400.

Also, each wire-like element preferably defines at least one curved surface, such as a convex or cylindrical surface, facing the drain holes 80. This serves to eliminate, or at least substantially minimize, deflection or splash-back of liquid toward the web. The curved surface of the wire-like element further facilitates flow of the liquid along the wire-like element and past the element into the interior of the drum 101.

Whether or not the element 400 has a curved surface facing the drain holes 80 in the particular embodiment illustrated in FIGS. 7–9, at least one wire-like element or portion thereof is preferably provided between the sleeve 64 and one or more of the support surfaces 316 (or other support structure) so as to define at least one open area adjacent the element. The open area is located at least partly between the support surface and one of the drain holes 80. The open area extends laterally beyond the support surface so as to accommodate fluid flow from the one drain hole past the support surface. In the illustrated embodiment wherein there are a plurality of elements 400, the open area is the space between the adjacent elements 400. Of course, when a forming sleeve 64 has a plurality of drain holes 80 that would be blocked or partially blocked by one or more support surfaces of the support drum, then it is preferable that a sufficient number of such wire-like elements 400 be provided to define a porous structure that substantially eliminates or reduces any blockage of all such drain holes by the drum support surfaces.

Figure 10:
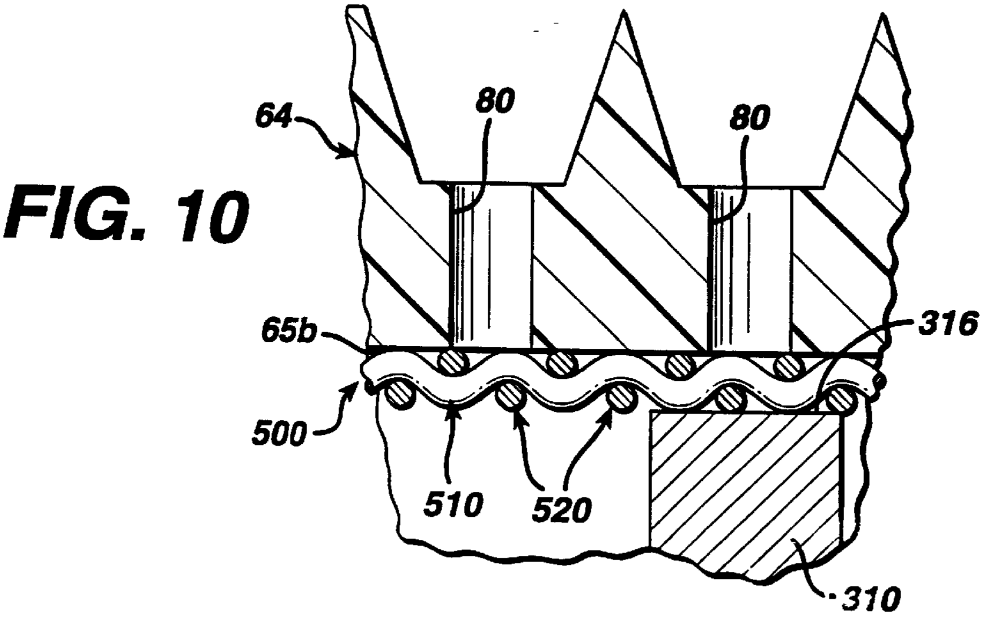
FIG. 10 is a view similar to FIG. 9, but FIG. 10 is more greatly enlarged and shows an alternate form of an element of the present invention.
Figure 11:
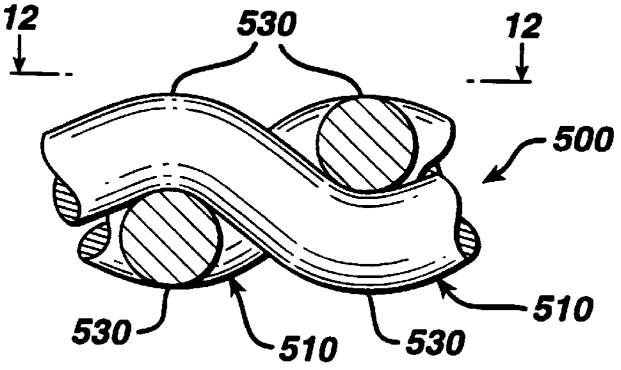
FIG. 11 is a greatly enlarged, fragmentary, side elevational view of a feature of the present invention which is incorporated in the apparatus illustrated in FIG. 10.
Figure 12:
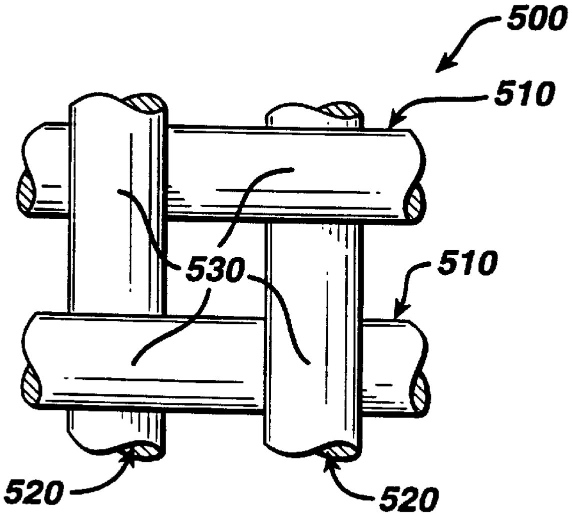
FIG. 12 is a fragmentary plan view taken generally along the plane 12—12 in FIG. 11.

FIGS. 10–12 illustrate a further embodiment of a porous structure which may be employed between sleeve 64 and support drum and support surface in accordance with the teachings of the present invention. The embodiment of the porous structure illustrated in FIGS. 10–12 may be characterized as a plain weave pattern metal screen 500. The screen 500 includes a first set of spaced-apart, parallel, wire-like elements 510 arranged with a substantially uniform spacing to define open areas between the elements 510. Each wire-like element 510 has a generally circular transverse cross section with a first predetermined diameter.

The porous structure 500 also includes a second set of spaced-apart, parallel, wire-like elements arranged with a substantially uniform spacing. Each element 520 has a generally circular transverse cross section with a diameter equal to the diameter of the elements 510. The elements 520 are oriented generally across, and perpendicular to, the first set of wire-like elements 510. The wire-like elements 510 and 520 are in contact at intersection regions to define a mesh having generally square openings of substantially uniform size. Each opening may be characterized as defining an open area through which liquid may flow. The elements 510 and 520 are preferably attached at the intersection regions.

With reference to FIGS. 11 and 12, the porous structure 500 may be characterized as having rounded knuckles 530 which present a smooth, curved surface for bearing against the mounting surface 65*b* of the sleeve 64 and for bearing against the support surfaces 316 of the mounting drum support bars 310. Such a smooth, rounded surface may present virtually a point contact to minimize resistance to flow, yet the rounded surface is less likely to damage the mounting surface 65*b* of the sleeve 64 compared to some non-curved configuration, such as an angled surface or sharply pointed surface.

Generally, with the mesh-type design of the porous structure 500, the preferred separation distance between the forming sleeve 64 and the drum support surfaces 316 is approximately twice the diameter of the wire-like elements 510 or 520.

One mesh-type porous structure 500 that has been found to be very effective may be characterized as a 10×10 array mesh made from 0.025 inch diameter wire having an open area of about 56.3%. The porous structure mesh was wrapped around the drum support structure and held in place by the overlying sleeve 64 mounted thereon. Welds were not required to attach the mesh to the drum support structure. Suitable metal wire screens are sold by, for example, McMaster Carr Supply Company, Dayton, N.J., U.S.A.

Although the presently contemplated preferred embodiment of the porous structure 500 is a metal screen or mesh as described above with reference to FIGS. 10–12, it will be appreciated that other materials and configurations may be employed.

Figure 13:
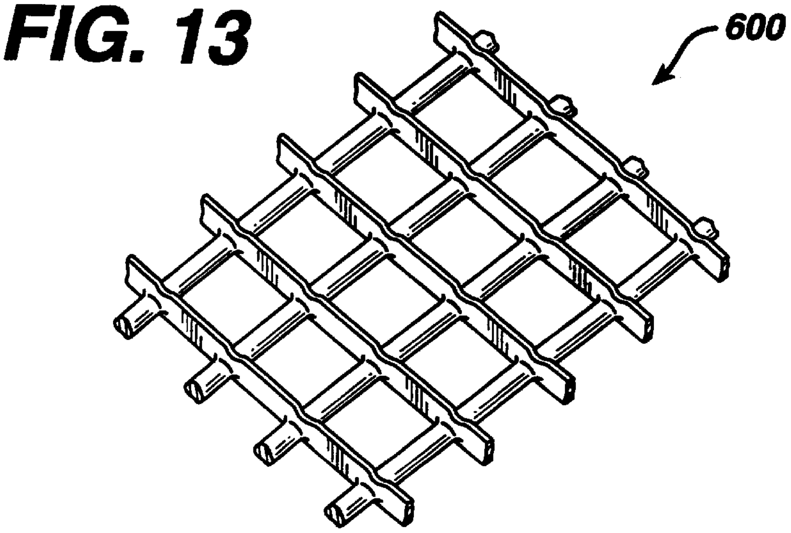
FIG. 13 is a fragmentary, perspective view of another form of an element of the present invention.
Figure 14:
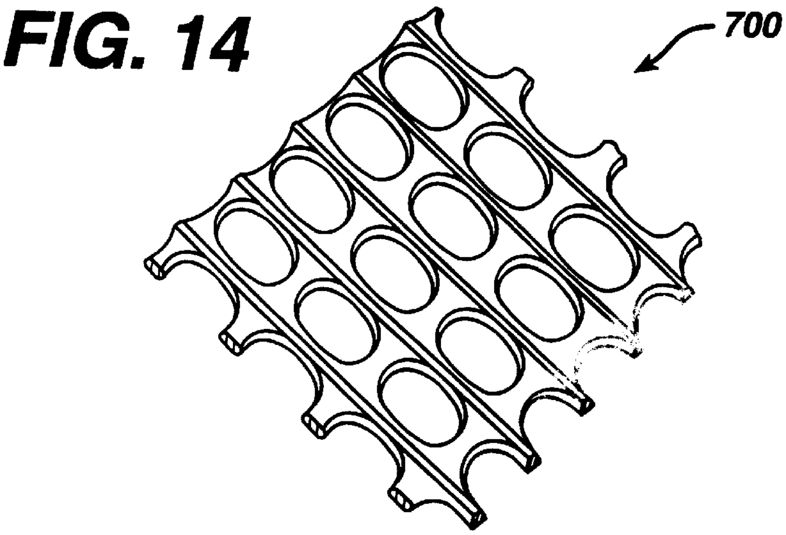
FIG. 14 is a fragmentary, perspective view of still another form of an element of the present invention.
Figure 15:
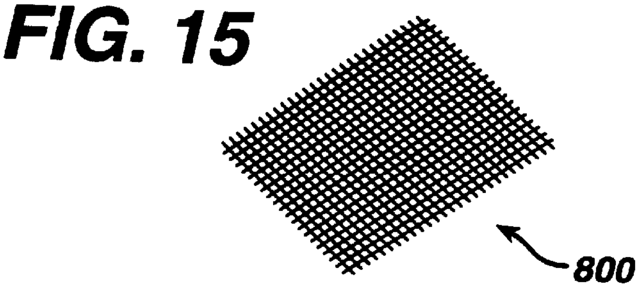
FIG. 15 is a fragmentary, perspective view of yet another form of an element of the present invention.

For example, the porous structure may include netting, mesh, or webbing extruded from a thermoplastic, polymeric material. FIG. 13 illustrates a grid-like porous structure 600 which is extruded from a thermoplastic material. FIG. 14 illustrates a porous structure 700 in the form of an extruded thermoplastic webbing. FIG. 15 illustrates a porous structure 800 defining a fine screen formed from wire or thermoplastic material.

Suitable, extruded, plastic mesh, netting, or webbing may be of the type sold by Conwed Corporation, a subsidiary of Leucadina National Corporation, having an office at 2640 Patton Road, Roseville, Minn. 55113, U.S.A. Examples of plastic netting sold by Conwed Corporation include the following: netting sold under the designation XN 7110 which has a strand count of 25×30 per inch; netting sold under the designation XN 1670 which has a strand count of 7×5 per inch; oriented plastic netting sold under the designation ON 6270 and having a strand count of 6×6 per inch; oriented plastic netting sold under the designation ON 3018 and having a strand count of 4×4 per inch; filtration netting sold under the designation ON 3335 which has a strand count of 6×18 per inch, which is 0.017 inch thick, which has an open area of about 85%, and which has a hole size of about 0.149 inch by 0.054 inch; and the product sold under the designation VEXAR Caseliner.

A polyester scrim that may be suitable as a porous structure according to the present invention is the product sold under the designation L2R 6Y3 by Bayex Division, Bay Mills, Ltd., P.O. Box 728, 39 Seapark Drive, St. Catharines, Ontario, Canada.

Porous belting material may also be used for the porous structure. Another porous structure that may be employed is the oriented netting disclosed in the U.S. Pat. No. 3,632,269.

Regardless of the configuration of the porous structure, the porous structure should preferably provide an opening width which is greater than the drum support structure surface width to insure that there is an adequate flow path for the liquid.

Also, when the porous structure is fabricated from wire-like elements for use with a typical size forming sleeve 64 having an outside diameter ranging from about 2 feet to about 6 feet, a length ranging from about 2 feet to about 16 feet, and a nominal wall thickness of about 0.25 inch, then such wire-like elements should preferably have a diameter of about 0.007 inch or greater so as to provide suitable geometric stability. (A sleeve 64 with substantially different dimensions could be used and/or the porous structure wire-like elements could be welded. In such cases, the wire diameter may be less than 0.007 inch. However, even where the porous structure is designed to be slid onto the forming sleeve like a sock, it may be advantageous to avoid use of a wire-like element with too small a diameter because some structural rigidity in the porous structure may be desirable for ease of handling.) Further, it is preferable that the porous structure have a minimum percent open area which is equal to 100 times the porous structure opening width squared divided by the square of the sum of the wire diameter and opening width.

Further, for a system in which a drain hole in a forming sleeve must accommodate the flow of one columnar stream of liquid, the equivalent hole diameter of the combined flow path defined by the assembly of the forming sleeve, porous structure, and drum should be equal to, and preferably greater than, the diameter of the liquid stream. This will insure that the liquid has sufficient momentum to prevent back flow and back splashing which may create defects in the web.

Also, where a porous structure comprises spaced-apart, wire-like elements, it is preferred that the difference between the area of a forming sleeve drain hole above an underlying drum support surface and the area of the maximum longitudinal cross-sectional area of the portion of the wire-like element extending across the drain hole should be greater than the transverse cross-sectional area of the columnar stream. In one presently contemplated system in which the forming sleeve drain holes are 0.041 inch in diameter and in which each drain hole is designed to pass the flow of a single columnar stream having a diameter of 0.025 inch, the porous structure is in the form of a wire screen in which the wire diameter is about 0.0325 inch.

If the drain hole is intended to accommodate the simultaneous flow of two or more columnar streams, then it is preferred that the difference between (a) the transverse cross-sectional area of the drain hole and (b) the maximum longitudinal cross-sectional area of the portion of the wire-like element extending across the drain hole should be greater than the sum of the transverse cross-sectional areas of any of the columnar streams that could flow through the drain hole.

Also, where the porous structure is a wire screen, then the product of (a) the spacing of the wires, and (b) twice the wire diameter should preferably be greater than the transverse cross-sectional area of the columnar stream. In a system wherein a drain hole over a drum support surface is intended to pass the flow of two or more columnar streams simultaneously, then the product of (a) the spacing of the wires, and (b) twice the wire diameter should preferably be greater than the sum of the transverse cross-sectional areas of any of the columnar streams that simultaneously flow through the one drain hole.

It will be appreciated that the porous structure may have other configurations. For example, wires or rods, such as the wire-like elements 400 of the porous structure illustrated in FIG. 7, may be wound in a helix around the circumference of the drum support surfaces.

It has been found that embodiments of the porous structure of the present invention may be effectively used in the production of an apertured web wherein the starting web is a thermoplastic film. An example of such -a film is the polyethylene film sold under the designation 4019 by Edison Plastics Company, 230 Enterprise Drive, Newport News, Va. 23603 U.S.A.

Other films which may be used include the polypropylene terpolymer film sold under the designation P18-3189 by Clopay Plastics Products Company, 4800 Interstate Drive, Cincinnati, Ohio 45246 U.S.A., with or without corona-discharge treatment, and the polyethylene film sold under the designation EMB-631 by Exxon Corporation, 351 North Oakwood Road, Lake Zurich, Ill. 60047 U.S.A.

It will also be appreciated that the porous structure of the present invention may be employed in processes wherein apertures are formed in a nonwoven fibrous web on a sleeve 64 or other type of forming member.

Although the forming sleeve 64 is a presently contemplated preferred configuration for a forming member or surface against which the web is forced by the columnar streams during the aperturing process, it will be appreciated that the forming member may have other configurations. The forming member may, for example, be provided in the form of a flat plate or a series of articulated flat plates on a conveyor belt. The conveyor belt may include suitable support structures for supporting the forming members. The porous structure of the present invention could be interposed between the plate-like forming members and the support structures of the conveyor. Plate-like forming members and forming members on conveyor systems are described in the above-identified U.S. Pat. No. 5,567,376, the disclosures of which are incorporated herein by reference thereto to the extent not inconsistent herewith.

It will be readily apparent from the foregoing detailed description of the invention and from the illustrations thereof that numerous variations and modifications may be effected without departing from the true spirit and scope of the novel concepts or principles of this invention.

What is claimed is:

1. Apparatus for supporting a starting web of material in a path of fluid directed at said starting web to cause formation of an apertured web, said apparatus comprising:

a support structure having at least one outwardly facing support surface;

a forming member mounted on said support structure and having a mounting surface on one side facing toward said one support surface of said support structure and having a web-engaging forming surface on the other side against which said starting web can be disposed, said web-engaging forming surface including recesses into which portions of said starting web may be deformed, said forming member defining drain holes extending from said recesses through said forming member to said mounting surface, at least one of said drain holes extending at least partly over said one support surface of said support structure; and a porous structure that is disposed between said support structure and said forming member mounting surface and that defines at least one open area which is located at least partly between said one support surface and said one drain hole and which extends laterally beyond said one support surface to accommodate fluid flow from said one drain hole past said one support surface.

2. The apparatus in accordance with claim 1 in which said forming member is one of an annular sleeve and an endless loop conveyor belt.

3. The apparatus in accordance with claim 1 in which said forming surface includes a plurality of said drain holes and each said drain hole has a generally circular transverse cross section.

4. The apparatus in accordance with claim 1 in which said apparatus is adapted for supporting said starting web in the form of a stretchable thermoplastic polymeric film adjacent a manifold defining a plurality of orifices from which said fluid is directed at said starting web as columnar streams of water.

5. The apparatus in accordance with claim 1 in which said apparatus is adapted for supporting said starting web in the form of a nonwoven fibrous layer adjacent a manifold defining a plurality of orifices from which said fluid is directed at said starting web as columnar streams of water.

6. The apparatus in accordance with claim 1 in which said support structure includes a plurality of spaced-apart bars, at least one of said bars having an outwardly facing, substantially planar surface defining said one support surface;

said bar planar surface extends at least partially across one of said forming member drain holes;

said porous structure is held against said one bar planar surface adjacent said one forming member drain hole; and said porous structure defines at least one convex surface that faces said forming member one drain hole, and is located between said one drain hole and said one bar planar surface.

7. The apparatus in accordance with claim 1 in which said porous structure includes a plurality of spaced-apart, generally cylindrical wires each having substantially the same diameter;

at least one of said wires has surface portions which lie in substantially line contact with said one support surface of said support structure and said forming member mounting surface; and each said wire is welded to said one support surface.

8. The apparatus in accordance with claim 1 in which said porous structure is a woven wire belt.

9. The apparatus in accordance with claim 1 in which said porous structure is a plain weave pattern screen made from filaments.

10. The apparatus in accordance with claim 1 in which said porous structure is a netting comprising a thermoplastic polymeric material.

11. An apparatus in accordance with claim 1 in which said porous structure is a mesh comprising a thermoplastic polymeric material.

12. An apparatus in accordance with claim 1 in which said porous structure includes portions which are each in substantially point contact with said forming member mounting surface and with said one support surface of said support structure.

13. An apparatus in accordance with claim 1 in which said porous structure includes at least a first set of spaced-apart, parallel, wire-like elements arranged with a substantially uniform spacing to define said one open area between two of said wire-like elements;

each said wire-like element has a generally circular transverse cross section with a first predetermined diameter; and one of said wire-like elements extends across a portion of said one drain hole.

14. An apparatus in accordance with claim 13 in which said porous structure includes a second set of spaced-apart, parallel, wire-like elements arranged with a substantially uniform spacing, each element of said second set having a generally circular transverse cross section with a diameter equal to said first predetermined diameter, said second set of wire-like elements being oriented generally across and perpendicular to said first set of wire-like elements, said first and second sets of wire-like elements being in contact at intersection regions to define a mesh having generally square openings of substantially uniform size wherein one of said generally square openings defines said one open area.

15. An apparatus in accordance with claim 13 in which said apparatus is adapted for use with fluid directed against said starting web as columnar streams of water wherein each stream has a substantially identical predetermined transverse cross-sectional area; and the difference between (a) the transverse cross-sectional area of said one drain hole and (b) the maximum longitudinal cross-sectional area of the portion of said one wire-like element extending across said one drain hole is greater than the sum of the transverse cross-sectional areas of any of the columnar streams that could simultaneously flow through said one drain hole.

16. An apparatus in accordance with claim 13 in which said apparatus is adapted for use with fluid directed against said starting web as columnar streams of water wherein each stream has a substantially identical predetermined transverse cross-sectional area; and the product of (a) the spacing of said wire-like elements and (b) twice said wire-like element diameter is greater than the sum of the transverse cross-sectional areas of any of the columnar streams that could simultaneously flow through said one drain hole.

17. An apparatus in accordance with claim 13 in which said support structure includes a plurality of said support surfaces equally spaced-apart in an array;

each said support surface has a substantially identical width; and the spacing between said wire-like elements is greater than said support surface width.

18. An apparatus in accordance with claim 13 in which said diameter of each of said wire-like elements is greater than 0.007 inch.

19. An apparatus in accordance with claim 13 in which the minimum percentage of open area of said porous structure is at least equal to said spacing between said wire-like elements squared and multiplied by 100 and divided by the square of the sum of (1) said wire-like element diameter and (2) said spacing between said wire-like elements.

* * * * *